United States Patent [19]
Yang

[11] Patent Number: 5,903,452
[45] Date of Patent: May 11, 1999

[54] ADAPTIVE SLOPE COMPENSATOR FOR CURRENT MODE POWER CONVERTERS

[75] Inventor: Ta-yung Yang, Tao Yuan, Taiwan

[73] Assignee: System General Corporation, Milpitas, Calif.

[21] Appl. No.: 08/907,888

[22] Filed: Aug. 11, 1997

[51] Int. Cl.$^6$ .............................................. H02M 7/5395
[52] U.S. Cl. ............................ 363/97; 363/21; 363/131
[58] Field of Search ..................................... 322/222, 282, 322/284, 285, 288; 363/21, 95, 97, 131

[56] References Cited

U.S. PATENT DOCUMENTS

| | | | |
|---|---|---|---|
| 4,717,994 | 1/1988 | Diaz et al. | 363/21 |
| 4,837,495 | 6/1989 | Zansky | 323/222 |
| 4,975,820 | 12/1990 | Szepesi | 363/21 |
| 5,001,620 | 3/1991 | Smith | 323/285 |
| 5,335,162 | 8/1994 | Martin-Lopez et al. | 363/97 |
| 5,710,697 | 1/1998 | Cooke et al. | 363/21 |
| 5,717,322 | 2/1998 | Hawkes et al. | 323/283 |

OTHER PUBLICATIONS

Keith H. Billings, "Switchmode Power Supply Handbook", McGraw–Hill Book Co., p. 3.148 –p.3.150, Dec. 1989.
Abraham I. Pressman, "Switching Power Supply Design", McGraw–Hill Book Co., pp. 105–136; pp. 143–165, Dec. 1991.

Unitrode Application Note U–97, "Modelling Analysis and Compensation of the Curent–Mode Converter", Unitrode Handbook, Dec. 1994.

Unitrode Application Note U–111, "Practical Considerations in Current Mode Power Supplies", Unitrode Handbook, Dec. 1994.

Primary Examiner—Jeffrey Sterrett

[57] ABSTRACT

A circuit of an adaptive slope compensator prevents instability in the current mode converter operating under a continuous mode. A timing capacitor, charged by a programmable current source, is used to generate a slope signal. The timing capacitor is discharged by a switching signal via a switching diode connection. The programmable current source is implemented by a transistor and three bias resistors. A voltage feedback signal of the converter is taken as an input to the programmable current source to control the slew rate and magnitude of the slope signal in response to the variations of the input voltage and the output power of the converter. The slope signal is added to a sensed current loop of the converter through an output diode and a resistor in series for providing necessary slope compensation.

5 Claims, 8 Drawing Sheets

ADAPTIVE SLOPE COMPENSATOR FOR CURRENT MODE POWER CONVERTERS

FIELD OF INVENTION

This invention relates to the power converters and more specifically to current mode power converters.

BACKGROUND OF THE INVENTION

Figure 1:
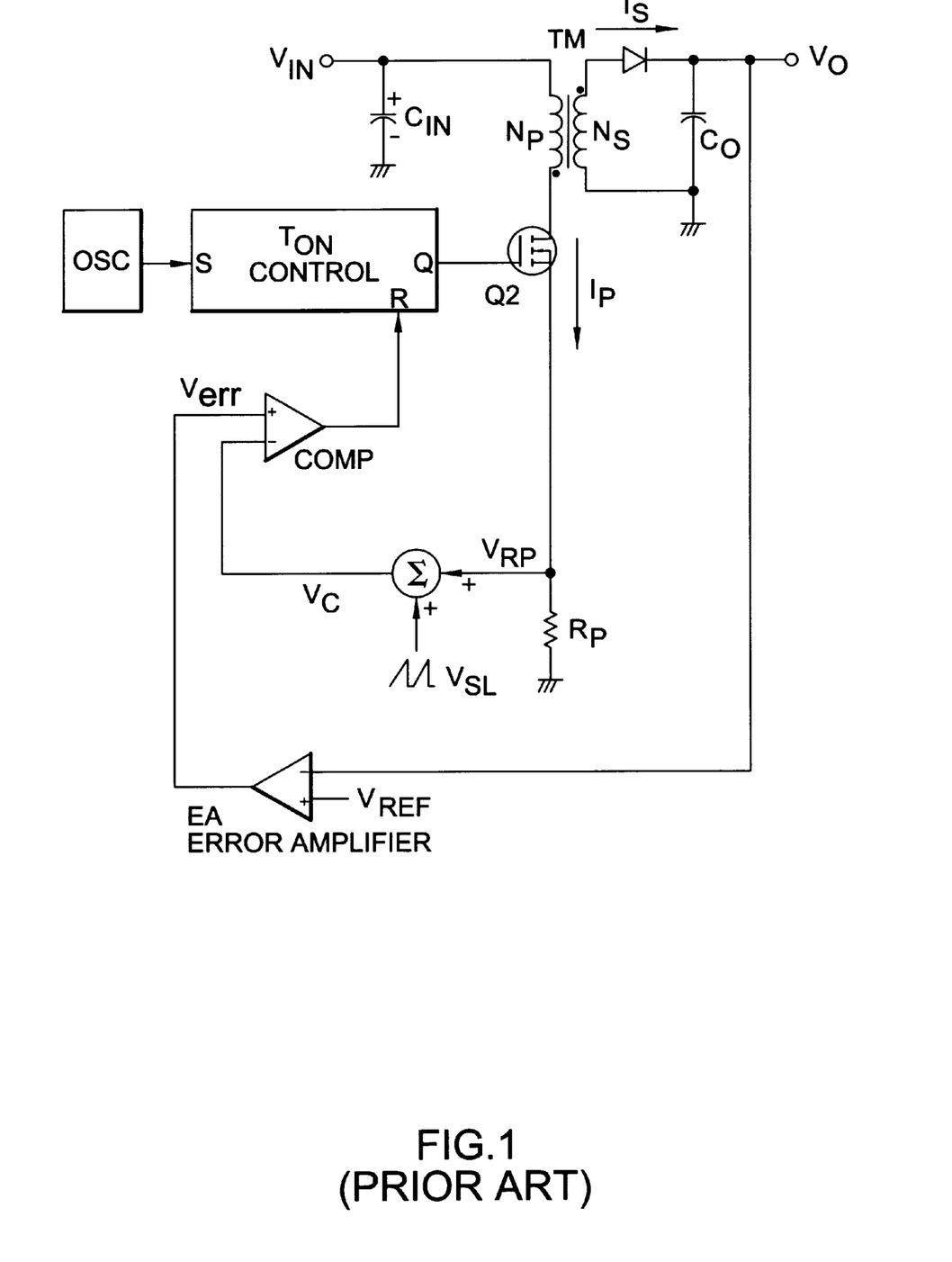
Figure 2:
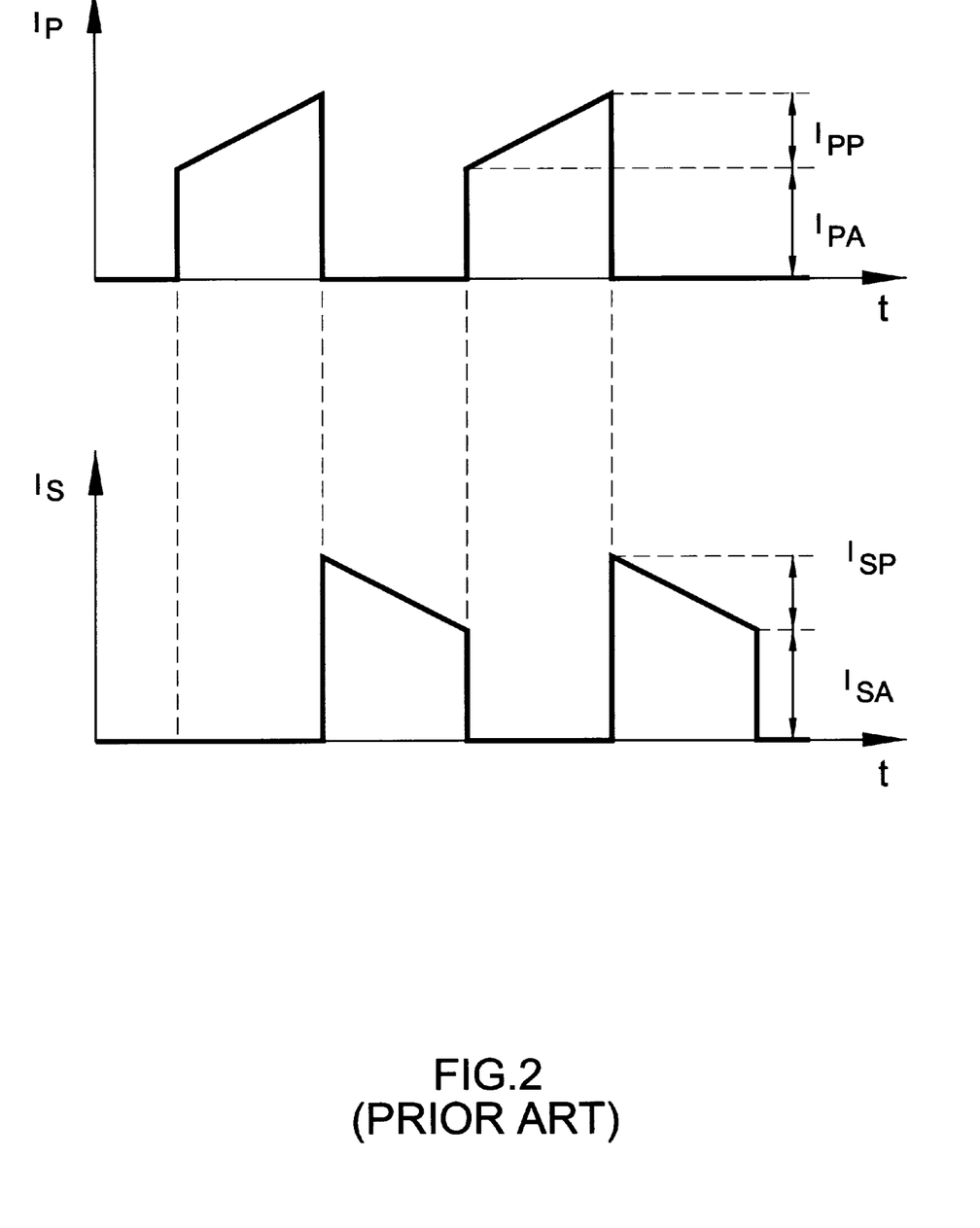

Various power converters are presently available for transforming an unregulated input voltage to a regulated output voltage with a specific magnitude. Various power conversion techniques such as forward and flyback are well described as the prior art. Although the advantages of current mode control over voltage mode control has been amply demonstrated, slope compensation must generally be added in the current loop to solve instability problems. Many texts explain the operation of current mode and the required slope compensation, such as (a) Keith H. Billings "Switchmode Power Supply Handbook" McGraw-Hill Book Co., p3.148–p3.150 (b) Abraham I. Pressman "Switching Power Supply Design" McGraw-Hill Book Co., p105–p136; p143–p165. (c) "Modelling, Analysis and Compensation of the Current-Mode Converter" Unitrode Corp. Application Note U-97 (d) "Practical Considerations in Current Mode Power Supplies" Unitrode Corp. Application Note U-111. However, there still exist several drawbacks in conventional slope compensation techniques. Thus, in order to remedy these drawbacks and improve performance, mathematical analysis and practical circuit tests have been performed to establish the fundamentals of this invention. The characteristic analysis of conventional slope compensation are listed as follows, (A) Advantage I: Slope compensation stabilizes the current loop A general circuit of a conventional current mode power converter is shown in FIG. 1, and its symbols defined are:

Pwr: power converter $T_M$: power transformer $N_P$: primary turn ratio of $T_M$ $N_S$: secondary turn ratio of $T_M$ $L_P$: primary inductance of $T_M$ $L_S$: secondary inductance of $T_M$ $I_P$: primary current of $T_M$ $I_{PP}$: primary peak current of $T_M$ $I_{PA}$: primary average current of $T_M$ $I_S$: secondary current of $T_M$ $I_{SP}$: secondary peak current of $T_M$ $I_{SA}$: secondary average current of $T_M$ T: switching period of Pwr $T_{ON}$: turn-on time of T $T_{OFF}$: turn-off time of T $V_O$: output voltage of Pwr $V_{IN}$: input voltage of Pwr $V_{SL}$: voltage of slope compensation signal Verr: output voltage of the error amplifier $V_{RP}$: sensed voltage of resistor $R_P$ There are two distinctly different operating modes of power converters, discontinuous and continuous. When higher power conversion efficiency is concerned, the continuous mode is much more widely used than the discontinuous mode. However, the power converter exhibits instability in continuous mode generally. The purpose of the following analysis is to determine the criterion for stabilizing the current loop in which a minimum magnitude of the slope compensation has to be added, if the power converter is operating in continuous current mode or if the duty cycle of the power converter is greater than 50 percent. Slope m is the down slope; $m=dIs/dt=Vo/Ls$. FIG. 2 shows the continuous mode current waveform, Ip and Is. $I_{SA}=I_{SP}-(dIs/2)=I_{SP}-(m/2)\cdot dt$; $I_{SA}=I_{SP}-(m/2)\cdot T_{OFF}$; $I_{SP}=I_{SA}+(m/2)\cdot(T-T_{ON})$. The peak voltage $V_{RP}$ across the primary current-sensing resistor $R_P$ is $V_{RP}=I_{PP}\cdot R_P=I_{SP}\cdot(Ns/Np)\cdot R_P=[I_{SA}+(m/2)\cdot(T-T_{ON})]\cdot Ns/Np\cdot R_P$. Adding the slope compensation to $V_{RP}$, this feedback signal is stated as $V_C=V_{RP}+(V_{SL}/T)\cdot\Delta T=V_{RP}+(V_{SL}/T)\cdot(\Delta T_{ON}+\Delta T_{OFF})$;

$$V_C = \frac{Ns}{Np}R_P I_{SA} + \frac{Ns}{Np}R_P\frac{mT}{2} + \Delta T_{ON}\left(\frac{V_{SL}}{T} - \frac{Ns}{Np}R_P\frac{m}{2}\right) + \Delta T_{OFF}\frac{V_{SL}}{T} \quad (1)$$

Since an amount of energy delivered in a time period T represents power, at the end of one period, power drawn from $V_{IN}$ is $P=L_P I_P^2/(2T)=[L_P\cdot(I_{PP}^2-I_{PA}^2)]/(2T)$. But $I_{PP}=I_{PA}+\Delta I_P=I_{PA}+(V_{IN}/L_P)\cdot\Delta T$, and thus $$P = \frac{1}{2TL_P}(V_{IN}^2 \cdot T_{ON}^2) + V_{IN} \cdot I_{PA}\frac{T_{ON}}{T} \quad (2)$$

The current $I_{PA}$ is an energy which cannot completely deliver to the load during the off time ($T_{OFF}$) and still remain in the transformer. Thus the magnitude of the current $I_{PA}$ is related to the $T_{OFF}$ and $T_{ON}$. It is easily verified from equation (2), that the feedback loop regulates the output of power converter by controlling $T_{ON}$. The output voltage Vo is sensed and compared to a reference voltage in the error amplifier (EA). The amplified error voltage Verr (voltage loop signal) is fed to a voltage comparator and compared with the Vc (current loop signal). As shown in FIG. 1, the on time starts at the clock pulse of oscillator (osc) and ends when the Vc ramp equals the level of Verr, thereby the adjustment of $T_{ON}$ is proportional to the magnitude of voltage Vc and Verr. Mathematically the relationship between Vc and $T_{ON}$ is $\partial V_C/\partial T_{ON}\geq 0$. The deviation from equation (1) can be stated as $$\frac{\partial V_C}{\partial T_{ON}} = \frac{V_{SL}}{T} - \frac{Ns}{Np}R_P\frac{m}{2}$$

This can be seen quantitatively as $$\frac{V_{SL}}{T} \geq \frac{Ns}{Np}R_P\frac{m}{2} \quad (3)$$

If the change of $T_{ON}$ is not proportional to the Vc, $\partial V_C/\partial T_{ON}<0$, then the feedback loop will oscillate non-linearly. Thus the criterion of equation (3) must be satisfied to insure loop stability.

(B) Advantage II: Slope compensation improves the linearity of the current loop

Before adding the slope compensation, the signal Vc is equal to $V_{RP}$:

$$\Delta I_P = \frac{V_{IN}}{Lp} \cdot \Delta T \quad (4)$$

$$V_{RP} = \left(I_{PA} + \frac{V_{IN}}{Lp}\Delta T_{ON}\right) \cdot R_P \quad (5)$$

Figure 3:
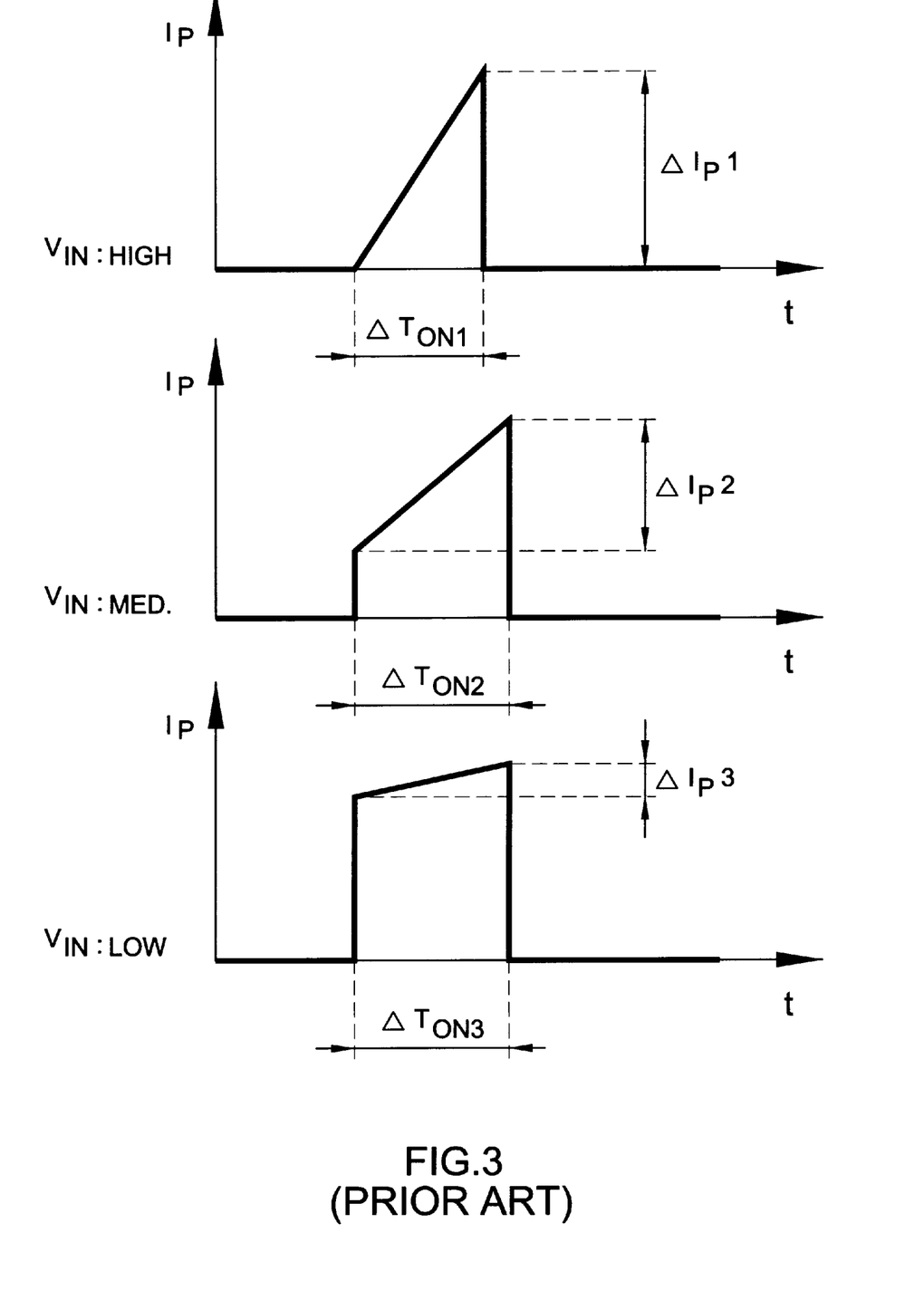

Equations (2), (4), and (5), demonstrate that when the output power remains constant, the $T_{ON}$ increases and $\Delta I_P$ decreases as $V_{IN}$ goes down. The current waveform corresponding to the $V_{IN}$ and $T_{ON}$ is shown in FIG. 3. The current feedback loop signal compared with the voltage feedback loop signal will control the output power and regulate the output voltage. It is obvious the control loop will lose linearity and immunity to noise as $V_{IN}$ goes down. This disadvantage can be improved by adding the slope compensation.

$$V_C = V_{RP} + \frac{V_{SL}}{T}(\Delta T_{ON} + \Delta T_{OFF}) \qquad (6)$$
$$= I_{PA} \cdot R_P + \frac{V_{SL}}{T}\Delta T_{OFF} + \Delta T_{ON}\left(\frac{V_{IN}}{Lp} \cdot R_P + \frac{V_{SL}}{T}\right)$$

The slope compensation element remains a minimum linearity of the control loop.

(C) Disadvantage I: A dummy load or the minimum load is required to avoid the unstable oscillation during no load or light load conditions.

The conventional mode power converter will operate in discontinuous mode while the output is in no load or light load conditions and may operate in continuous mode while the output power is high or the input voltage is low. A minimum magnitude of slope compensation must be added as equation (3), as long as the power converter operates in the continuous mode. While the power converter is operating in discontinuous mode, its slope compensation included current feedback loop signal Vc is $$V_C = \frac{V_{IN}}{Lp} \cdot R_P \cdot \Delta T_{ON} + \frac{V_{SL}}{T}(\Delta T_{ON} + \Delta T_{OFF}) \qquad (7)$$

Figure 4:
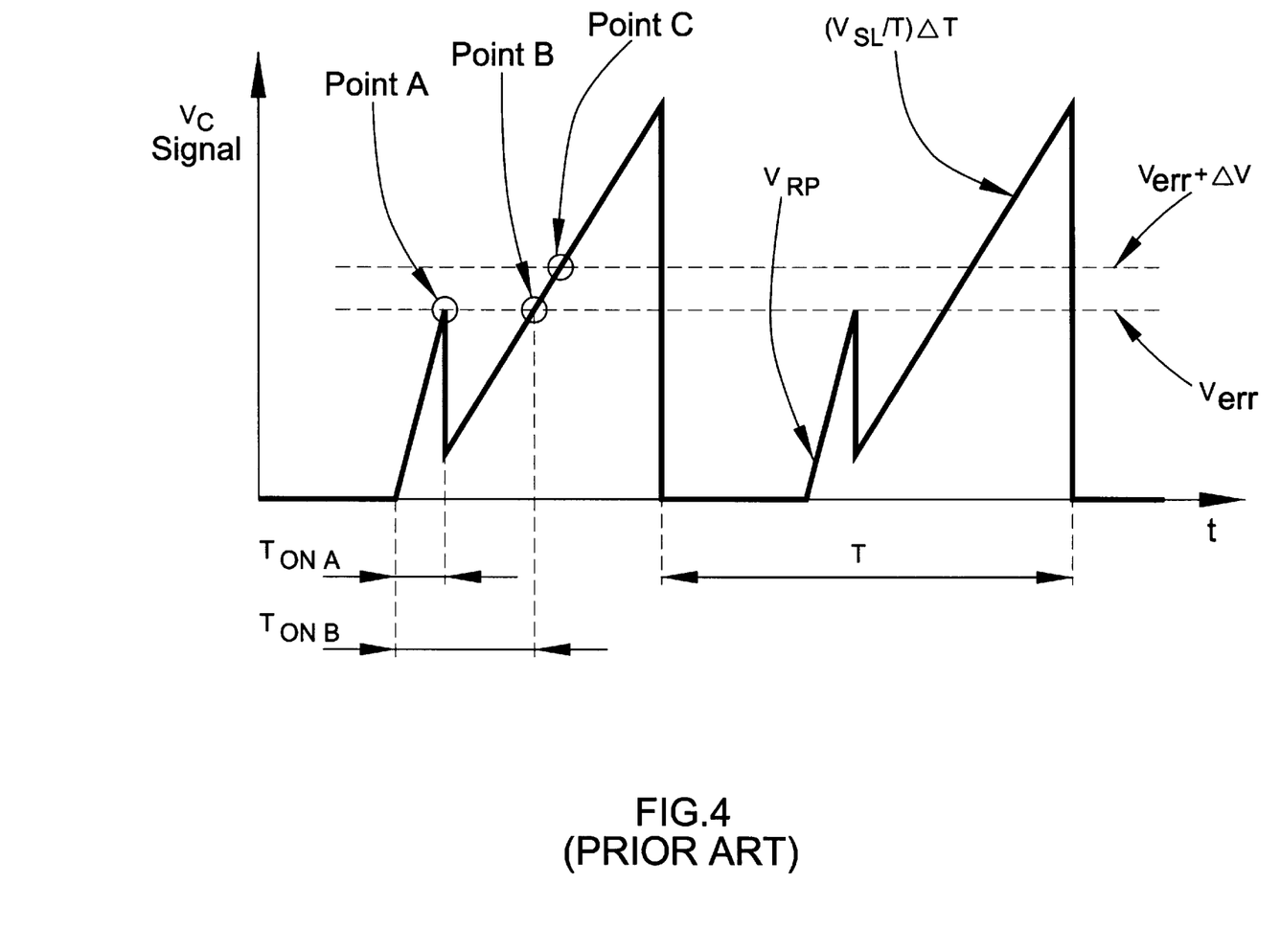

This signal waveform is shown in FIG. 4: illustrating a nonlinear deviation in the power control. If the signal Verr goes down due to the regulation, its voltage move from point C to point A or point B will cause a nonlinear deviation. Since the voltage level of point A is equal to point B, but the on time ($T_{ON}$) of point A and point B is different, difference is ($T_{ONB}-T_{ONA}$) causes a deviation $P_d$ in the power control.

$$P_d = \frac{V_{IN}^2}{2TLp}(T_{ONB}^2 - T_{ONA}^2) \qquad (8)$$

Because of this, an oscillation commences at every change in signal Verr which may continue for some time. Two conventional approaches for solving this problem are (a) To equip with a dummy load in the output. This yield $[I_P \cdot R_P > (V_{SL}/T)]$ during the no load or light conditions. However this will consume the power of the dummy load. (b) To require consuming a minimum power in the load. However this cannot meet the requirements of power management. The goal of power management is to manage the system to only consume power during the operation such that no power, or little power is consumed during the non-operation (sleep mode). With respect to the power converter in a power management application, conserving power in the no load or light load conditions is a major requirement.

(D) Disadvantage II: Less than ideal line voltage regulation

Consider how the power converter regulates against line voltage changes. As $V_{IN}$ goes up, the Vo will eventually go up. Then after a delay in getting through the voltage feedback loop, Verr will go down and the output voltage will be brought back down. Besides the mechanics of this, there is a shortcut correction in the current mode operation. As $V_{IN}$ goes up, the slope of current Ip increases and hence the slope of the ramp of $V_{RP}$ increases. Now the steeper ramp equals Verr and the on time ($T_{ON}$) is shortened. Output voltage changes resulting from input voltage changes will be smaller in amplitude and shorter in duration because of this feedforward characteristic. The output voltage Vo is $$V_O = V_{IN} \frac{Ns}{Np} \frac{T_{ON}}{T_{OFF}}$$

By using equation (7), if Vc=Verr, then $$T_{ON} = \frac{Verr}{\left(\frac{V_{IN}}{Lp} \cdot Rp + \frac{V_{SL}}{T}\right)} \qquad (9)$$

It can be seen that the loop gain of this feedforward characteristic will be reduced by increasing the magnitude of slope compensation $V_{SL}/T$. Thus, increasing the magnitude of slope compensation will decrease the loop gain of the current feedback loop and then reduce the capability of line voltage regulation.

Figure 5:
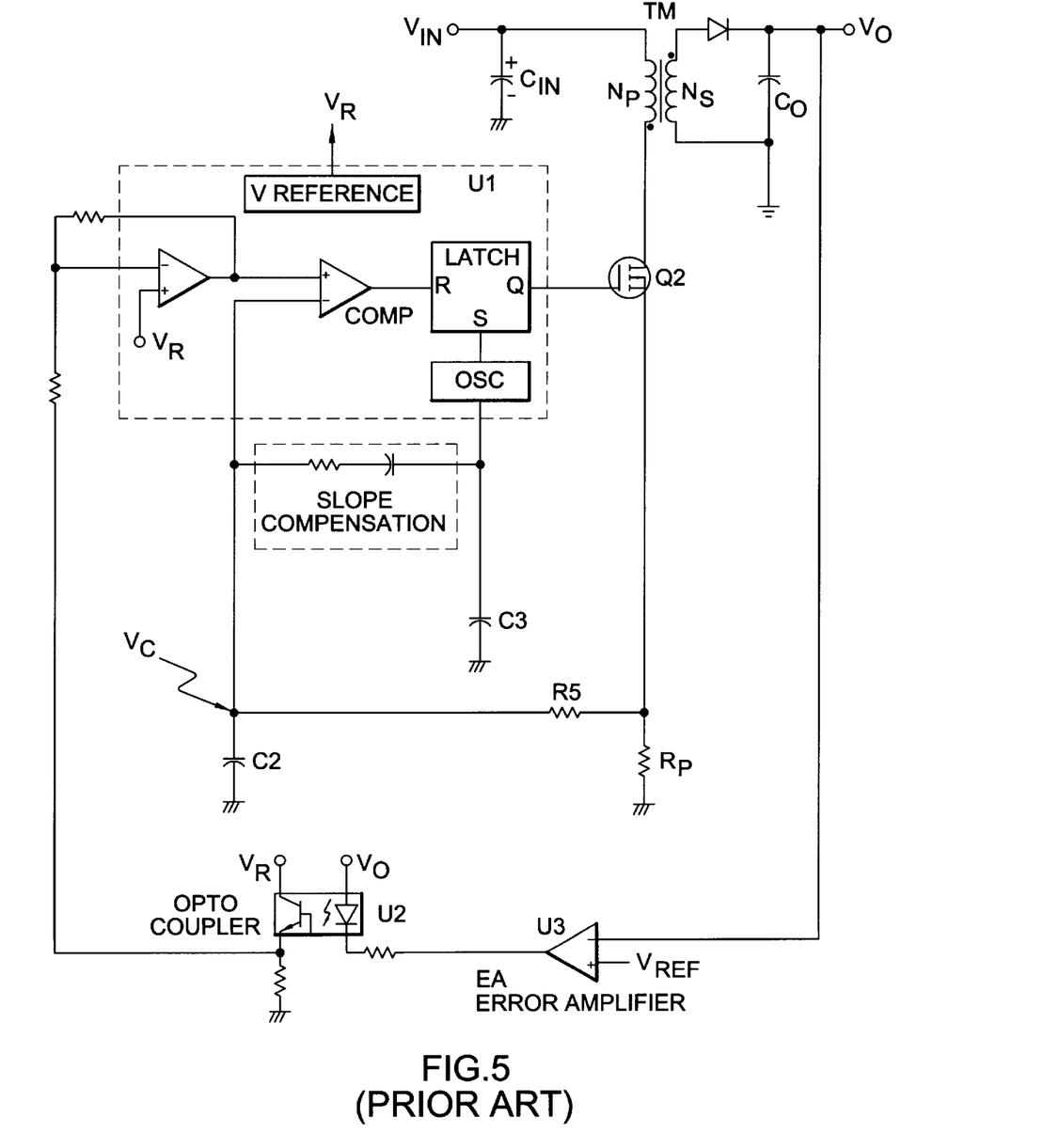
Figure 6:
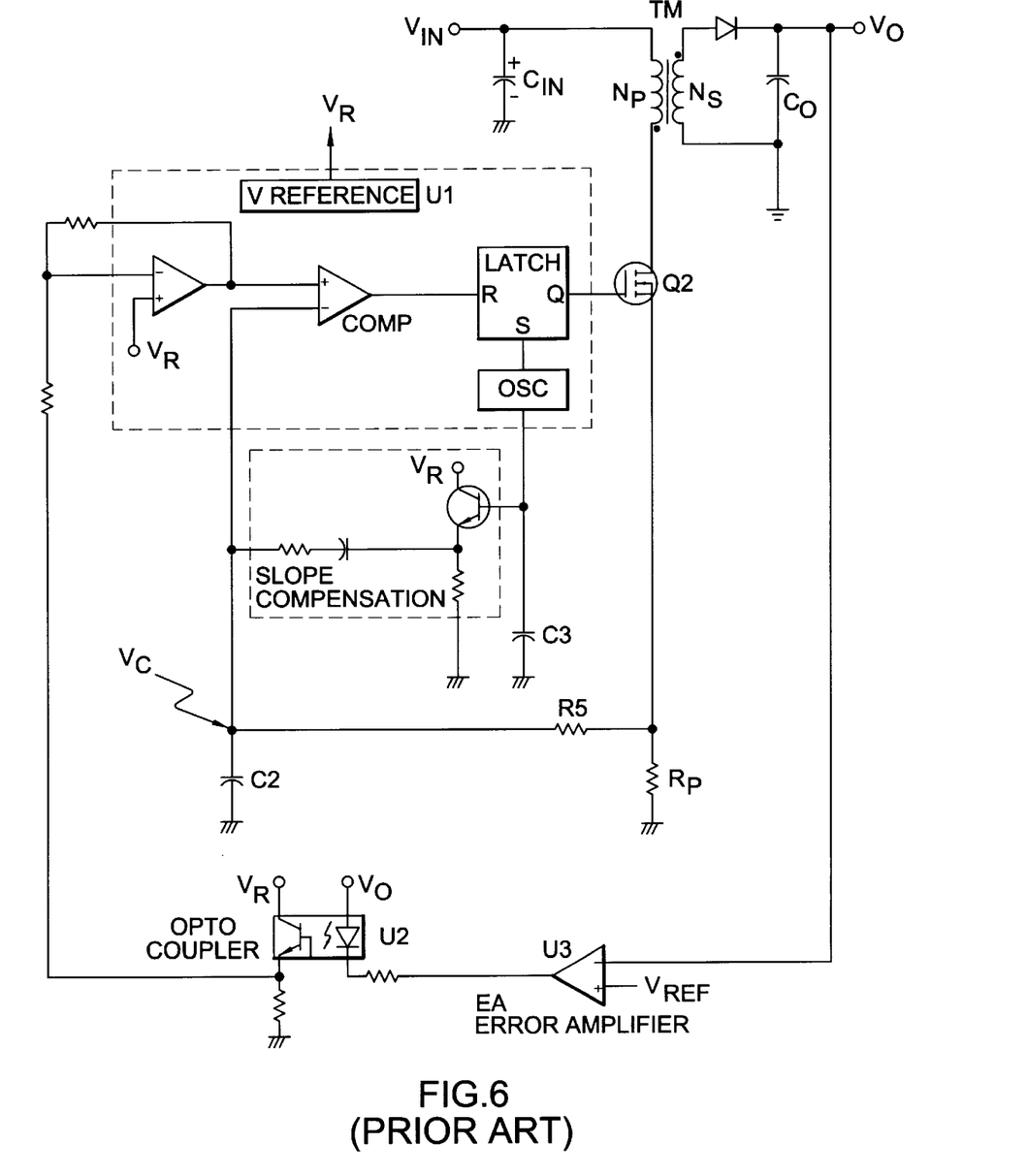

FIGS. (5) and (6) show two conventional methods of implementing slope compensation. These methods, however, are unable to solve the problems in the previous description and are unable to operate under wide input ranges ($V_{IN}$).

OBJECTS OF THE INVENTION

In view of the above advantages and disadvantages with the conventional approaches the object of the present invention is to provide a solution to these disadvantages and achieve a power conversion suitable for wide input voltage ranges. Additionally, the objects of the present invention are:

(a) to improve the power conversion efficiency and save energy.

(b) to shrink the volume of power converter and save the material costs.

These objects are realized in a novel slope compensation construction which allows the power converter to operate in continuous mode under the medium load or heavy load condition. Furthermore, no minimum load or dummy load is required under the light load or no load conditions. The adaptive function of the present invention enhances the linearity of the control loop in response to a lower input voltage and permits a higher duty cycle ($T_{ON}/T_{OFF}$), thereby necessitating only smaller input capacitor. In an off-line power converter, a high voltage, high capacity electrolytic capacitor is expensive and large. It is much more compact and cost effective to use a smaller input capacitor.

SUMMARY OF THE INVENTION

In accordance with the present invention, a programmable current source comprises a capacitor, generating a slope signal. This slope signal is added to a current feedback loop for slope compensation. The slope signal is synchronized with the switching signal of power converter via connection to a diode; the input of the programmable current source having a resistor, coupled to the voltage feedback loop of the power converter, and generating a slope signal in response to the input voltage and output load of power converter. The slew rate and magnitude of the slope signal is responsive to the input voltage and output load, and the signal width of the slope signal is equal to the pulse width of the switching signal of power converter.

BRIEF DESCRIPTION OF THE DRAWINGS

FIG. (1) is a simplified circuit illustrating a conventional current mode power converter;

FIG. (2) shows continuous mode current waveforms;

FIG. (3) shows the current waveform under relatively high and relatively low $V_{IN}$;

FIG. (4) is the current loop feedback signal, in which the slope compensation signal is added, thus illustrating of a nonlinear deviation in the power control;

FIGS. (5) and (6) show, respectively, two forms of prior art circuits;

FIG. (7) is a schematic diagram illustrating a preferred embodiment of the present invention; and FIG. (8) is the voltage waveform of ripple in the input capacitor.

DETAILED DESCRIPTION OF PREFERRED EMBODIMENT

Figure 7:
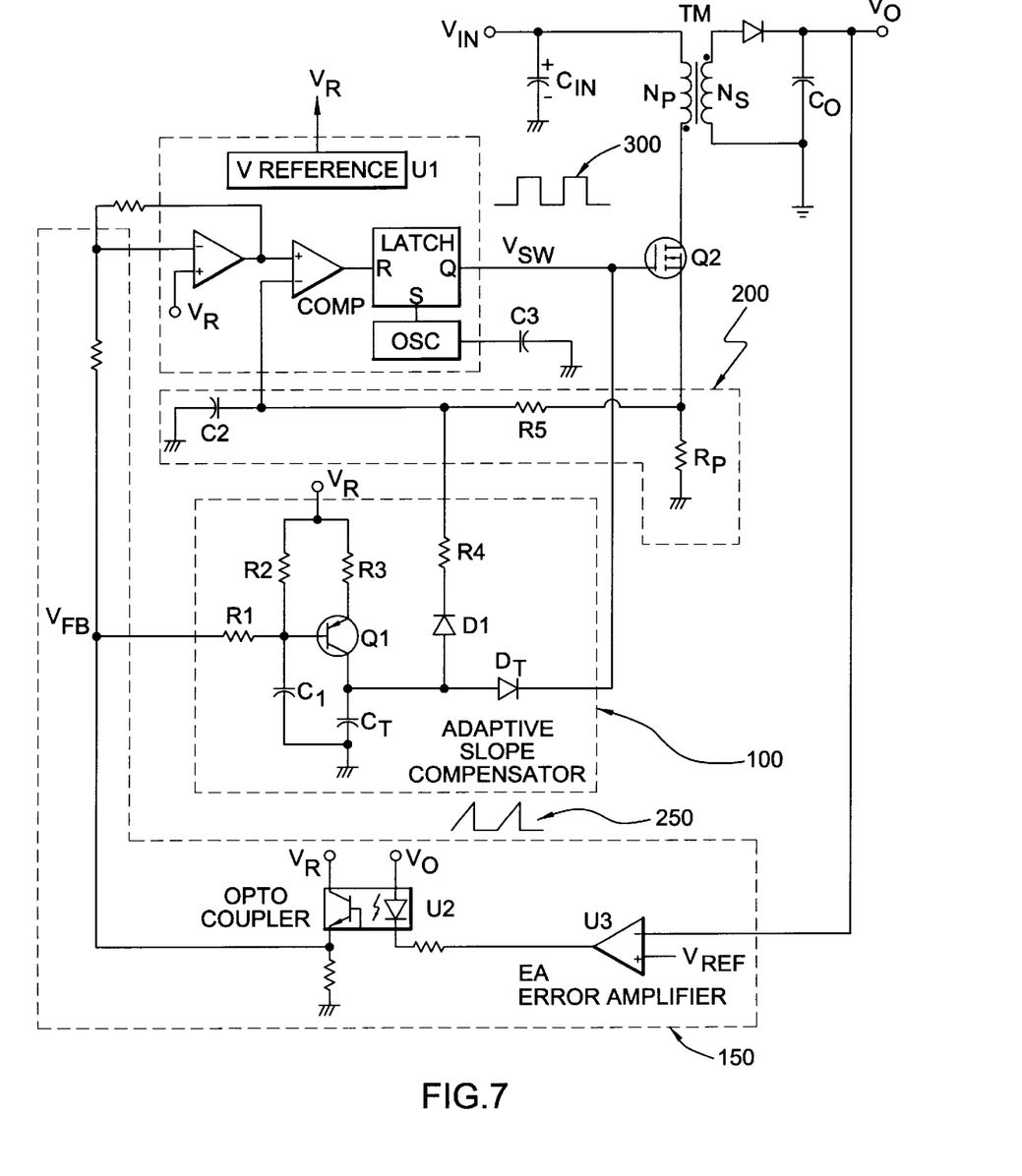

FIG. (7) shows an embodiment of a current mode power converter constructed in accordance with the present invention. PWM controller $U_1$ is a general control circuit for current mode power conversion. The switching signal $V_{SW}$ (the output of $U_1$) drives a switching MOSFET $Q_2$. A transformer $T_M$ is placed in series with $V_{IN}$ and $Q_2$ for the power transfer. Switching frequency is determined by capacitor $C_3$ and the oscillator (osc) in $U_1$. The Latch of $U_1$ is set by osc and reset by the comparator (Comp) in $U_1$. Thus, the on time starts at the clock pulse of osc and ends when the voltage level of the signal from the current feedback loop 200 equals the voltage level of a signal from a voltage feedback loop 150. The voltage feedback loop consists of error amplifier $U_3$ and optocoupler $U_2$. The output voltage of power converter, Vo, is sensed and compared to a reference voltage in the error amplifier $U_3$. The optocoupler $U_2$ is required for the isolation in an off-line power converter, otherwise the amplified error voltage can be directly fed to the comparator of $U_1$. Another input to the comparator is the current feedback signal in which the primary current of transformer $T_M$ is sensed by resistor $R_P$, and is coupled to $U_1$ via the low pass filter $R_5$ and $C_2$. Adaptive slope compensator 100 has a pnp transistor $Q_1$, and incorporates resistors $R_1$, $R_2$, $R_3$ to form a programmable current source. Power is supplied from $V_R$ of $U_1$, as a constant voltage (reference voltage) output of $U_1$. The output of the programmable current source, the collector of $Q_1$, has a capacitor $C_T$ connected to ground, which serves to produce a slope waveform, and provides the time constant for the slew rate of the slope signal. A diode $D_T$ is connected between the output of the programmable current source and the output of $U_1(V_{SW})$, which serves to synchronize the slope signal 250 with the switching signal $V_{SW}$, 300. Bridged by the series of $D_1$ and $R_4$, slope signal 250 is added to the current loop 200. Via resistor $R_1$, the input of the programmable current source is connected to any suitable means, exemplified here as $V_{FB}$, a voltage feedback loop signal, and thereby the output current of the programmable current source is effected by input voltage $V_{IN}$ and output the power $P_O$ of power converter.

OPERATION

The operation of the device of FIG. (7) in accordance with the invention is as follows:

During the on time ($T_{ON}$), the switching signal $V_{SW}$ is high and diode $D_T$ is off, capacitor $C_T$ is charged by the programmable current source. Mathematically this can be stated as $$V_{SL} = \frac{I_{R3} \cdot \Delta T}{C_T}$$

If the gain ($h_{FE}$) of Q1 is high enough, then $I_{R3} = (V_{R2} - V_{EB(Q1)})/R_3$ $V_{R2} = (V_R - V_{FB}) \cdot [R_2/(R_1 + R_2)]$ The equation can be written as $$V_{SL} = \frac{\Delta T}{R3 \cdot C_T}\left[(V_R - V_{FB}) \cdot \frac{R2}{R1 + R2} - V_{EB(Q1)}\right] \quad (10)$$

$$\frac{\partial V_{SL}}{\partial V_{FB}} = \frac{-R2}{R3(R1 + R2)C_T} \cdot \Delta T \quad (11)$$

Since the change of $V_{FB}$ is directly proportional to the change of $V_{IN}$ and inversely proportional to the change of output power $P_O$, $\Delta V_{FB} = +K_1 \Delta V_{IN} - K_2 \Delta P_O$, where $K_1$, $K_2$ are loop gain constants of the voltage feedback loop. Thus, the equation (11) can be stated as:

$$\Delta V_{SL} = \frac{R2}{R3(R1 + R2)C_T} \Delta T \cdot (-K_1 \Delta V_{IN} + K_2 \Delta P_O) \quad (12)$$

During the off time ($T_{OFF}$), the switching signal $V_{SW}$ is low, diode $D_T$ is on, capacitor $C_T$ is discharged and the slope signal is reset to zero. Since the slope signal is synchronized the switching signal, the rising time $\Delta T$ of slope signal is equal to the on time $T_{ON}$. Thus equations (10) and (12) can be written as:

$$V_{SL} = \frac{T_{ON}}{R3C_T}\left[(V_R - V_{FB}) \cdot \frac{R2}{R1 + R2} - V_{EB(Q1)}\right] \quad (13)$$

$$\Delta V_{SL} = \left(\frac{R2}{R1 + R2}\right)\frac{T_{ON}}{R3C_T} \cdot (-K_1 \Delta V_{IN} + K_2 \Delta P_O) \quad (14)$$

Figure 8:
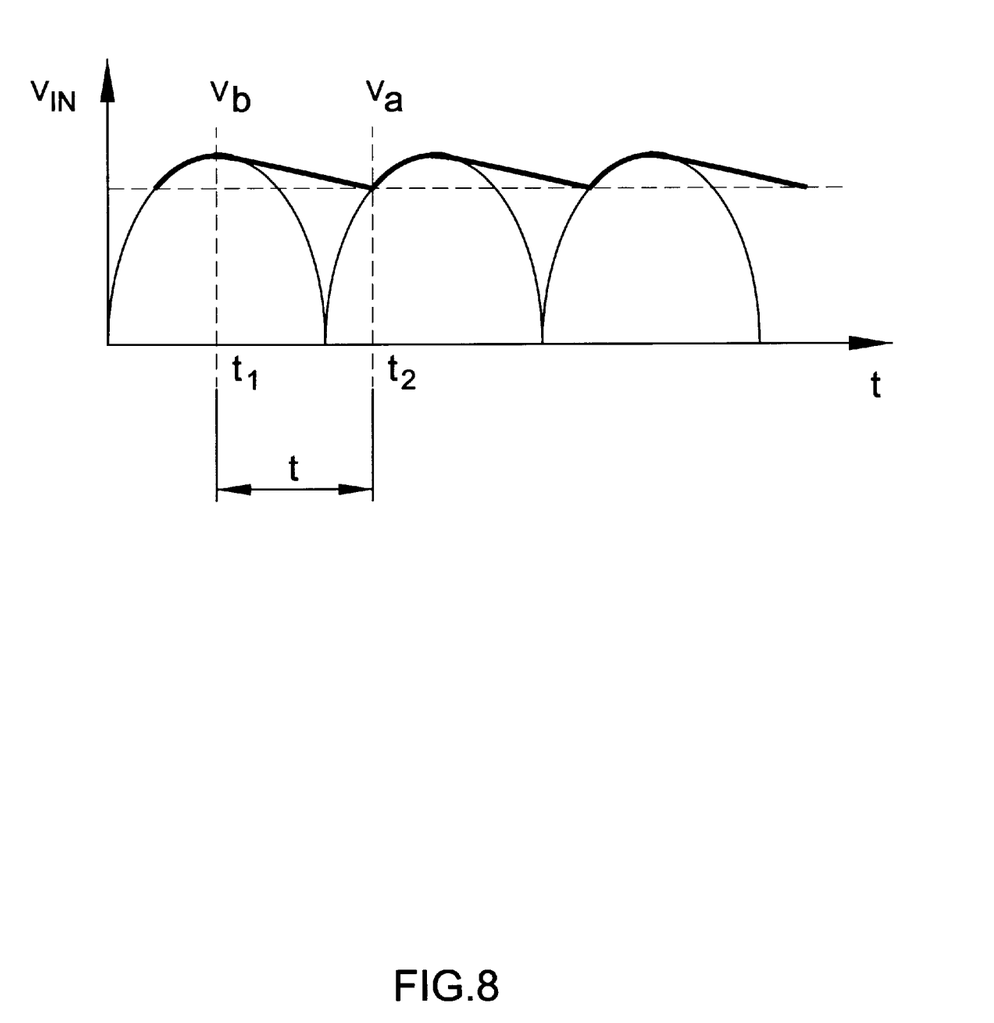

In one specific implementation of the FIG. (7) arrangement, a 50 W ($P_O$: $20V_{DC}/2.5$ A) off-line power converter, the input voltage is rated $90V_{AC}\sim265V_{AC}$ RMS, using a small input capacitor $C_{IN}$ as 68 uF (microfarad), 400 volt electrolytic device. An EFD-30 ferrite core was used, operating in continuous mode under the medium load and full load. An efficiency of 85%~88% was obtained responding to the change of $V_{IN}$ ($90V_{AC}\sim265V_{AC}$). Furthermore, less than 2 W was consumed under the no load condition. According to the principle of equations (13), (14) and the measurement in the implementation, the following results were observed:

(a) The operation of the power converter was stable under the continuous mode and high duty cycle operation (e.g. $T_{ON}/T_{OFF} \approx 8/2$). The slope compensation was increased in response to the increase of output power or the decrease of input voltage $V_{IN}$ respectively, and vice versa. The slope compensation was increased while $V_{IN}$ decreased, thereby providing enough linearity for a low $V_{IN}$. The ripple voltage waveform of $C_{IN}$ is shown in FIG. (8).

$$\varepsilon = P_O \cdot t = \frac{1}{2}C_{IN}(V_b^2 - V_a^2)$$

$$C_{IN} = \frac{2 \cdot P_O \cdot t}{V_b^2 - V_a^2}; \text{ where } V_b = 1.414\, V_{IN(AC)}$$

Since a low Va is permitted a small capacitor $C_{IN}$ is allowed. The slope compensation is reduced in response to the increase of $V_{IN}$, thus maintaining the performance of line regulation and audio susceptibilities.

(b) The slope signal will be reduced to zero under the light load and no load conditions. Additionally, the slope signal is synchronized with the switching signal $V_{SW}$, in which the slope signal is reset to zero at the end of on time ($T_{ON}$). Therefore the oscillation under the light load or no load is avoided. Therefore, dummy load or minimum load is not required.

What is claimed is:

1. An adaptive slope compensator for compensating a current mode power converter comprising:

a programmable current source which generates a programmable current;

a grounded capacitor associated with said programmable current source to generate a slope signal;

a switching diode for synchronizing said slope signal with a switching signal of said power converter, wherein said slope signal is reset to zero in response to an off state of said switching signal;

an input stage of said programmable current source having an input resistor coupled to a voltage feedback loop of said power converter to affect the magnitude of said programmable current and said slope signal;

wherein the slew rate of said slope signal is responsive to the signal of said voltage feedback loop during an on state of said switching signal;

said slew rate and magnitude of said slope signal are inversely proportional to a change of input voltage of said power converter and are directly proportional to a change of output power of said power converter; and an output stage of said programmable current source has an output diode and an output resistor coupled in series to a current feedback loop of said power converter to achieve the slope compensation.

2. The adaptive slope compensator in accordance with claim 1, wherein said programmable current source includes said grounded capacitor at its output terminal to generate the waveform of said slope signal and provide a time constant for the adjustment of said slew rate.

3. The adaptive slope compensator in accordance with claim 1, wherein said output stage of said programmable current source has said switching diode connected to said switching signal therein for synchronizing said slope signal.

4. The adaptive slope compensator in accordance with claim 1, wherein said programmable current source includes:

a pnp transistor for current control;

an emitter resistor connected between the emitter of said pnp transistor and a constant voltage source for current setting;

a base resistor connected between the base of said pnp transistor and said constant voltage source for providing bias to said pnp transistor;

said input resistor operatively connected to the base of said pnp transistor and said voltage feedback loop for programming the magnitude of said programmable current;

wherein said programmable current is linearly responsive to said signal of said voltage feedback loop; and a filter capacitor positioned at the base of said pnp transistor to eliminate switching noise of said power converter.

5. The adaptive slope compensator in accordance with claim 1, wherein the magnitude of said signal of said voltage feedback loop is directly proportional to the change of input voltage and is inversely proportional to the change of output power.

* * * * *